(12) United States Patent
Noeldner (10) Patent No.: US 10,342,090 B2
(45) Date of Patent: Jul. 2, 2019

(54) ILLUMINATED DOORKNOB AND LOCKSET

(71) Applicant: Christopher Noeldner, Belleville, IL (US)

(72) Inventor: Christopher Noeldner, Belleville, IL (US)

( * ) Notice: Subject to any disclaimer, the term of this patent is extended or adjusted under 35 U.S.C. 154(b) by 0 days.

(21) Appl. No.: 15/830,684

(22) Filed: Dec. 4, 2017

(65) Prior Publication Data
US 2018/0160498 A1 Jun. 7, 2018

Related U.S. Application Data (60) Provisional application No. 62/429,753, filed on Dec. 3, 2016.

(51) Int. Cl.
| | | |
|---|---|---|
| *E05B 17/10* | (2006.01) | |
| *H05B 33/08* | (2006.01) | |
| *H05B 37/02* | (2006.01) | |
| *G08B 5/36* | (2006.01) | |
| *E05B 17/00* | (2006.01) | |
| *E05B 55/00* | (2006.01) | |
| *E05B 1/00* | (2006.01) | |

(52) U.S. Cl.
CPC ......... *H05B 33/0854* (2013.01); *E05B 17/10* (2013.01); *G08B 5/36* (2013.01); *H05B 37/0218* (2013.01); *H05B 37/0227* (2013.01); *E05B 1/003* (2013.01); *E05B 17/0083* (2013.01); *E05B 55/00* (2013.01); *Y02B 20/44* (2013.01); *Y02B 20/46* (2013.01)

(58) Field of Classification Search
CPC .... E05B 17/10; E05B 17/0083; E05B 1/0007; E05B 2047/0048; E05B 2047/0095; H05B 33/0854; H05B 37/02; H05B 37/0227; H05B 37/0218; Y02B 20/46; G08B 5/36

See application file for complete search history.

(56) References Cited

U.S. PATENT DOCUMENTS

| | | | | |
|---|---|---|---|---|
| 3,955,075 A | * | 5/1976 | Susedik | E05B 17/10 362/100 |
| 5,398,175 A | * | 3/1995 | Pea | E05B 17/10 315/84 |
| 6,729,740 B1 | * | 5/2004 | Gazard | E05B 17/10 362/100 |
| 7,476,002 B2 | * | 1/2009 | Wolf | A01M 1/2083 362/231 |
| 9,530,262 B2 | * | 12/2016 | Johnson | H04W 4/80 |
| 2016/0353542 A1 | * | 12/2016 | Orr | H05B 33/0854 |

* cited by examiner

*Primary Examiner* — Haissa Philogene
(74) *Attorney, Agent, or Firm* — Lewis Rice LLC (57) ABSTRACT

An illuminated doorknob or lockset which provides for a self-contained unit where light components and all control apparatus are included within the structure of the doorknob or lockset. The doorknob or lockset will generally provide for a dual signal activation where activation of illumination occurs only after a certain level of dimness is detected and motion is detected within a certain range of the doorknob or lockset. The doorknob or lockset may also include an audible sound which is triggered in conjunction with the illumination.

14 Claims, 8 Drawing Sheets

ILLUMINATED DOORKNOB AND LOCKSET

CROSS REFERENCE TO RELATED APPLICATION(S)

This Application claims the benefit of U.S. Provisional Patent Application Ser. No. 62/429,753, filed Dec. 3, 2016, the entire disclosure of which is herein incorporated by reference.

BACKGROUND OF THE INVENTION

1. Field of the Invention

The present invention generally relates to an illuminated doorknob or lockset and more particularly relates to an illuminated doorknob or lockset to provide easier in and out movement through the door of a dark room.

2. Description of Related Art

Lights in the night have long been useful for providing small amounts of illumination so individuals can safely pass through various rooms of a structure without causing difficulty sleeping or substantial changes to eye dilation after night vision has been established. The human eye is sensitive enough, in most cases, to see the light of a single match at the distance of one mile. This dim illumination is measurable as a single digit number of photons. Therefore, not much light is required for humans to navigate by.

The human eye sees at night via the rod receptors of the eye which are wired together in order to provide for such low light illumination. However, because of the nature of such vision, color is generally not present at low illumination levels and human vision is primarily focused on the periphery of the eye as this is where the rods are clustered. Nightlights, therefore, traditionally supply low levels of illumination and are spread around the structure. This can allow a human to see general shapes within a structure, without having their night vision (which can take 45 minutes to fully develop) lost during their navigation. Effectively, nightlights provide enough illumination to effectively allow humans to see shapes and navigate, but not enough to cause them to lose their ability to see into darker areas.

Conventional nightlights are plugged into a wall socket and provide illumination to a restricted area around the wall plug. Generally, they are therefore positioned around outlets in a manner that individuals can navigate from outlet to outlet to move from one room to another room like bathroom. However, houses rarely have a perfect path of outlets between two specific locations to provide a clear path. Thus, individuals have been forced either to place more nightlights than may be desirable, or to accept dark patches where they cannot navigate well.

In such process of navigation in the dark, many individuals, and especially the elderly, are prone to hit the sidewalls, corners of beds, and other furniture, which can results in swelling, stubbed toes and bruised shins as well as more dangerous actions such as falls. The problem is particularly exaggerated if there are items scattered on the floor of the structure (such as toys) that are unexpected. Another major problem is doors. One of the biggest surprises when walking around at night is suddenly walking into a door that was thought to be open, but was closed by a different family member, or has mostly shut due to a draft or temperature shift. Further, in case of power failure at night it becomes nearly impossible for the individual to move in the house without hitting other objects in the room as most nightlights operate on AC power and shut down when the power goes out.

Therefore, there is need in the industry for an illuminated doorknob that illuminates on detecting movement of an individual towards the door. Further, the illuminated doorknob ideally could be able to generate sound signals to assist individuals (especially blind individuals) in detecting the position of the door.

SUMMARY OF THE INVENTION

There is described herein embodiments of an illuminated doorknob or lockset which provides for a self-contained unit where light components and all control apparatus are included within the structure of the doorknob or lockset. The doorknob or lockset will generally provide for a dual signal activation where activation of illumination occurs only after a certain level of dimness is detected and motion is detected within a certain range of the doorknob or lockset. The doorknob or lockset may also include an audible sound which is triggered in conjunction with the illumination.

There is also described herein, in an embodiment, an illuminated doorknob comprising: a housing configured to be secured to a door; a light sensor in the housing configured to generate a signal upon a certain light level being detected; a motion sensor in the housing configured to generate a signal on detecting movement of individual towards the housing; a light emitting diodes configured to illuminate on receiving the signals from the motion sensor and the light sensor; and a battery to provide electrical current the light sensor, the motion sensor, and the light emitting diode.

There is also described herein, in an embodiment, an illuminated doorknob comprising: a housing configured to be secured to a door in place of a doorknob; a light sensor in said housing configured to generate a signal upon a certain light level being detected; a motion sensor in said housing configured to generate a signal on detecting movement of individual towards said housing; a light emitting diode configured to illuminate on receiving said signals from said motion sensor and said light sensor; and a battery to provide electrical current said light sensor, said motion sensor, and said light emitting diode.

In an embodiment, the illuminated doorknob further comprises a resistor to maintain flow of current from the battery to the light sensor, the motion sensor, and the light emitting diode.

In an embodiment of the illuminated doorknob, the light sensor, the motion sensor, and the light emitting diode are mounted on a circuit board.

In an embodiment of the illuminated doorknob, the circuit board is located within a rose of the doorknob.

In an embodiment of the illuminated doorknob, the doorknob is part of a lockset.

In an embodiment, the illuminated doorknob further comprises an audio unit which produces a human audible sound while the light emitting diode is illuminated.

In an embodiment of the illuminated doorknob, the housing comprises a knob and said light emitting diode illuminates said knob from within said housing.

In an embodiment of the illuminated doorknob, the knob is made of translucent material.

In an embodiment of the illuminated doorknob, the translucent material diffuses light.

In an embodiment of the illuminated doorknob, the light emitting diode is within said knob.

DESCRIPTION OF THE PREFERRED EMBODIMENT(S)

The present disclosure relates to an illuminated doorknob or lockset which provides for an illumination element included in the structure of a doorknob and associated mount, latch and lock (if present). It should be recognized that doorknobs (or door handles as they are sometimes called) can come in a large variety of shapes and designs and the present disclosure provides for only a limited number of such embodiments. Further, the present embodiments are generally sized and shaped to intermesh and operate with standard holes and connections for doorknobs and locksets in existing doors as understood by those of ordinary skill in the art.

An illuminated doorknob or lockset for producing audio-visual signals may be produced in many different configurations, forms and materials. There is depicted in the drawings, and will herein be described in detail, various embodiments of doorknobs and locksets, with the understanding that the present disclosure is to be considered as an exemplification of the principles of the invention and the associated functional specifications and means for performing them and is not intended to limit the invention to the embodiment illustrated. Those skilled in the art will envision many other possible variations within the scope of the technology described herein.

Figure 1:
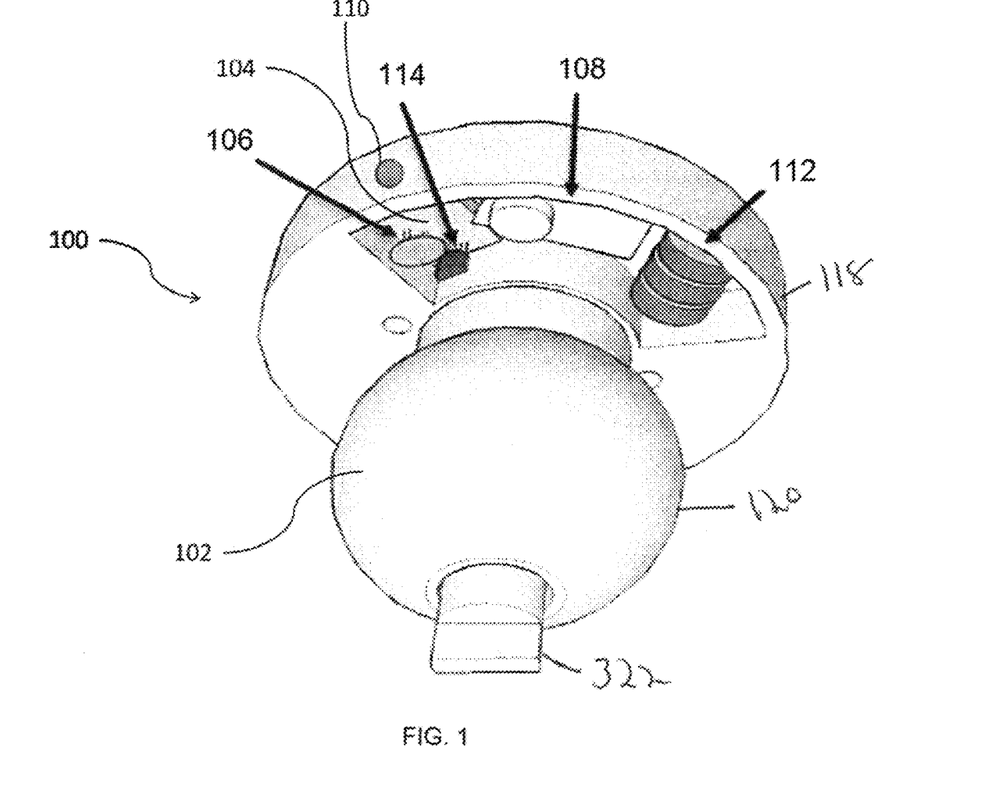
FIG. 1 illustrates a perspective view of an embodiment of an illuminated doorknob.
Figure 2:
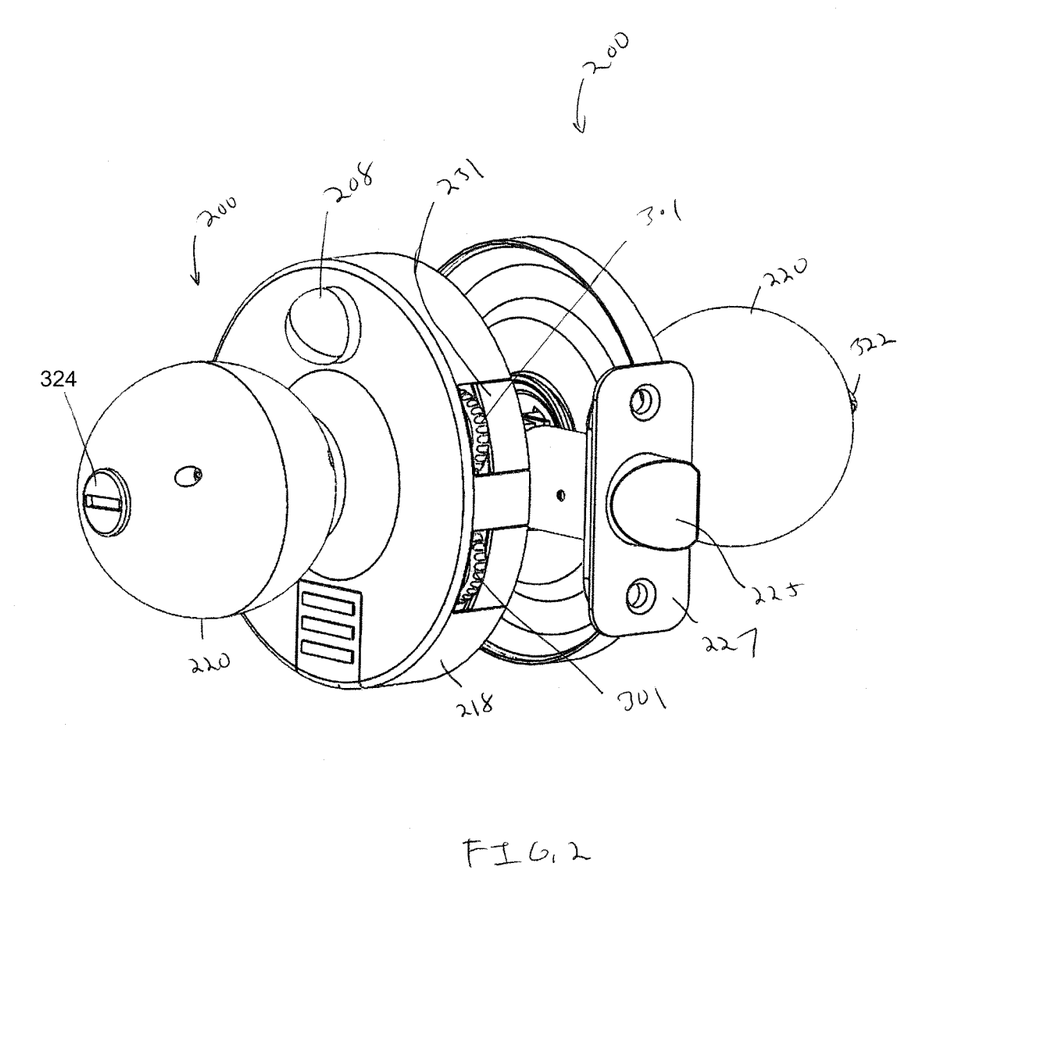
FIG. 2 illustrates a perspective view of an embodiment of an illuminated lockset.
Figure 3:
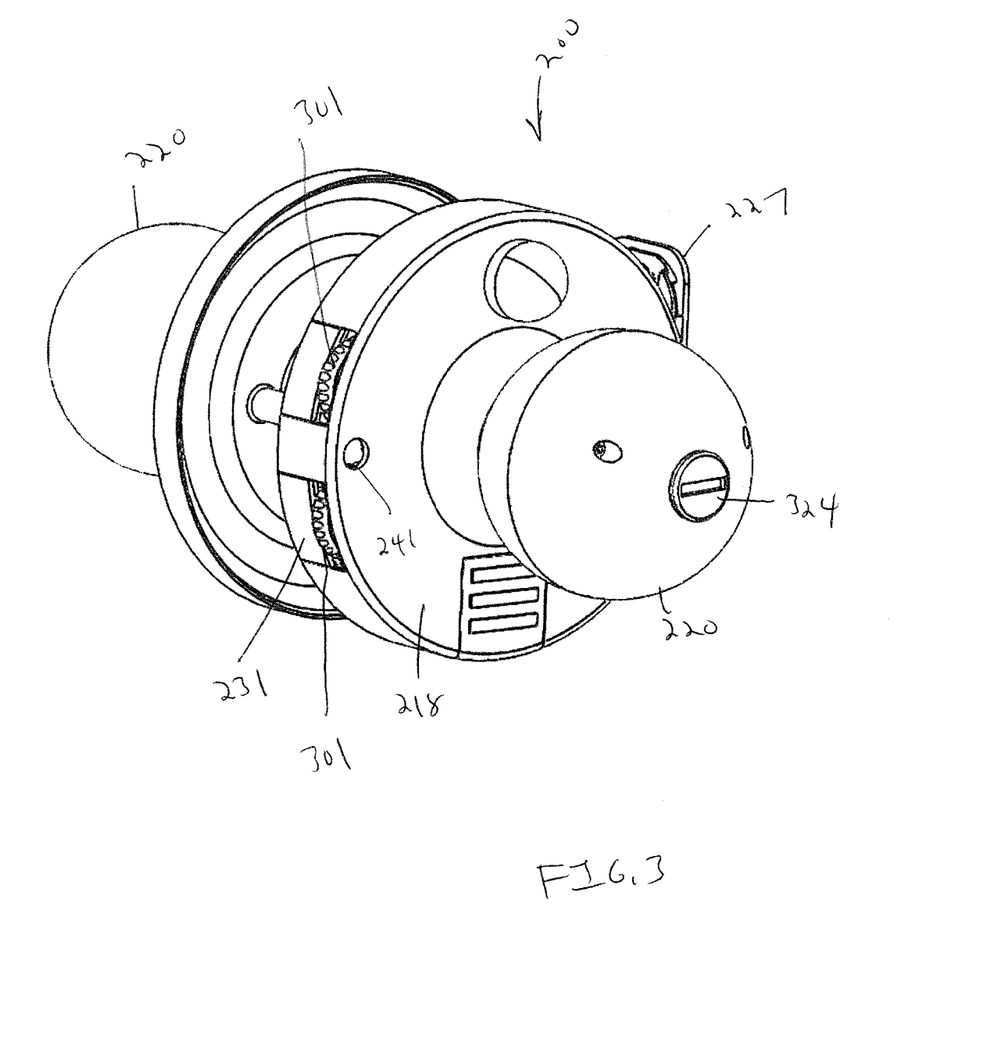
FIG. 3 illustrates the illuminated lockset of FIG. 2 from the opposing direction.
Figure 4:
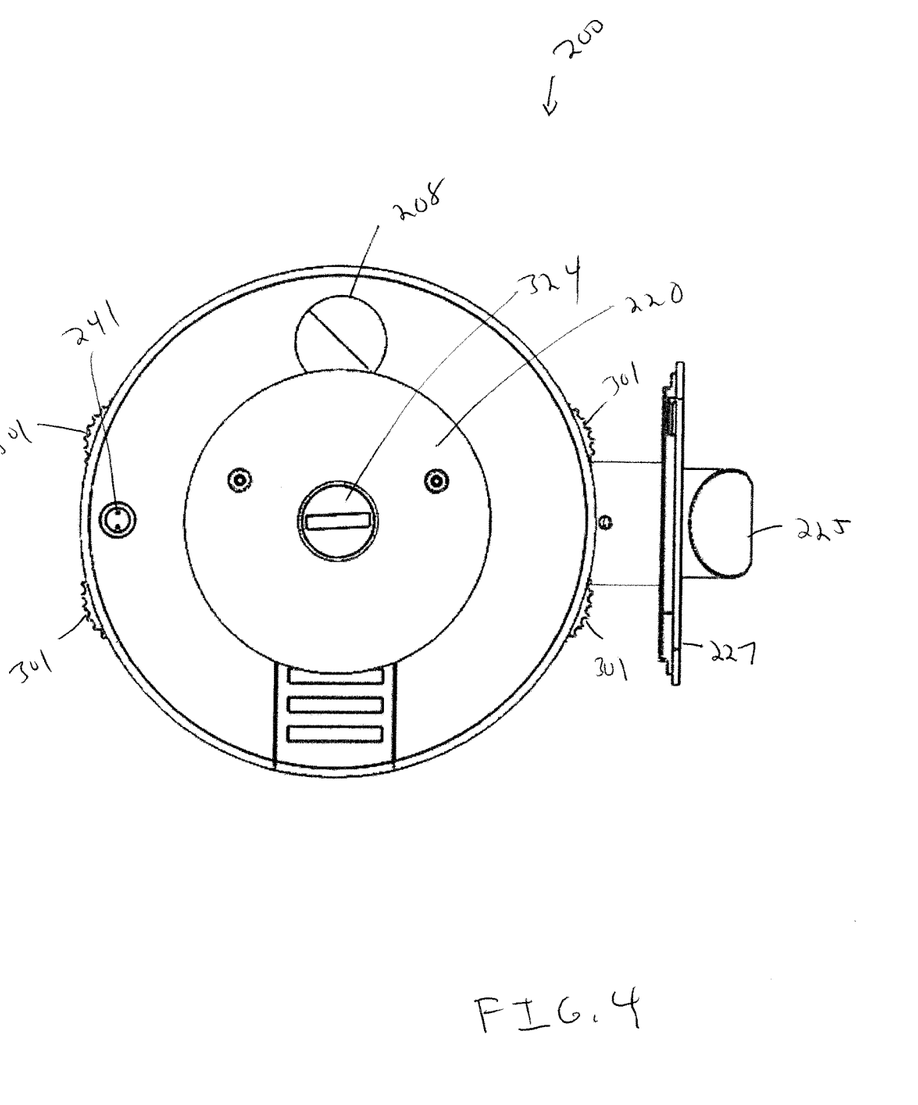
FIG. 4 illustrates the illuminated lockset of FIG. 2 from the key facing.
Figure 5:
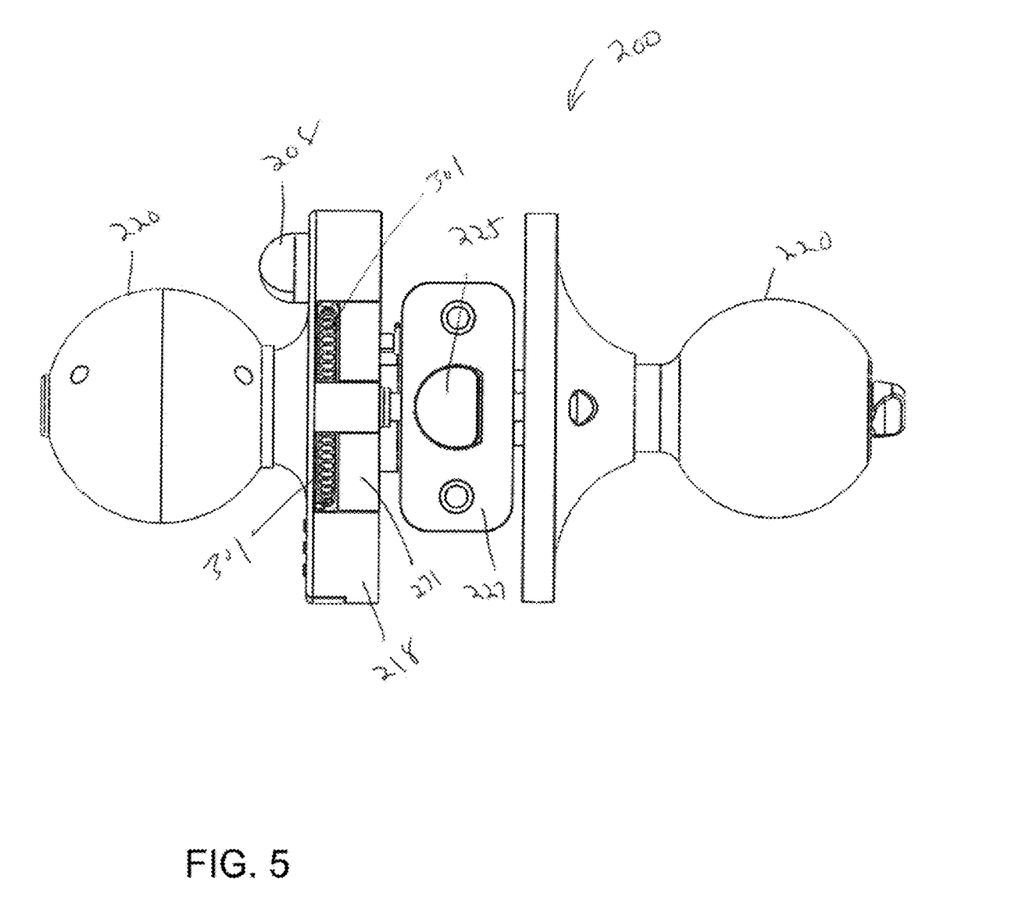
FIG. 5 illustrates the illuminated lockset of FIG. 2 from the latch facing.
Figure 6:
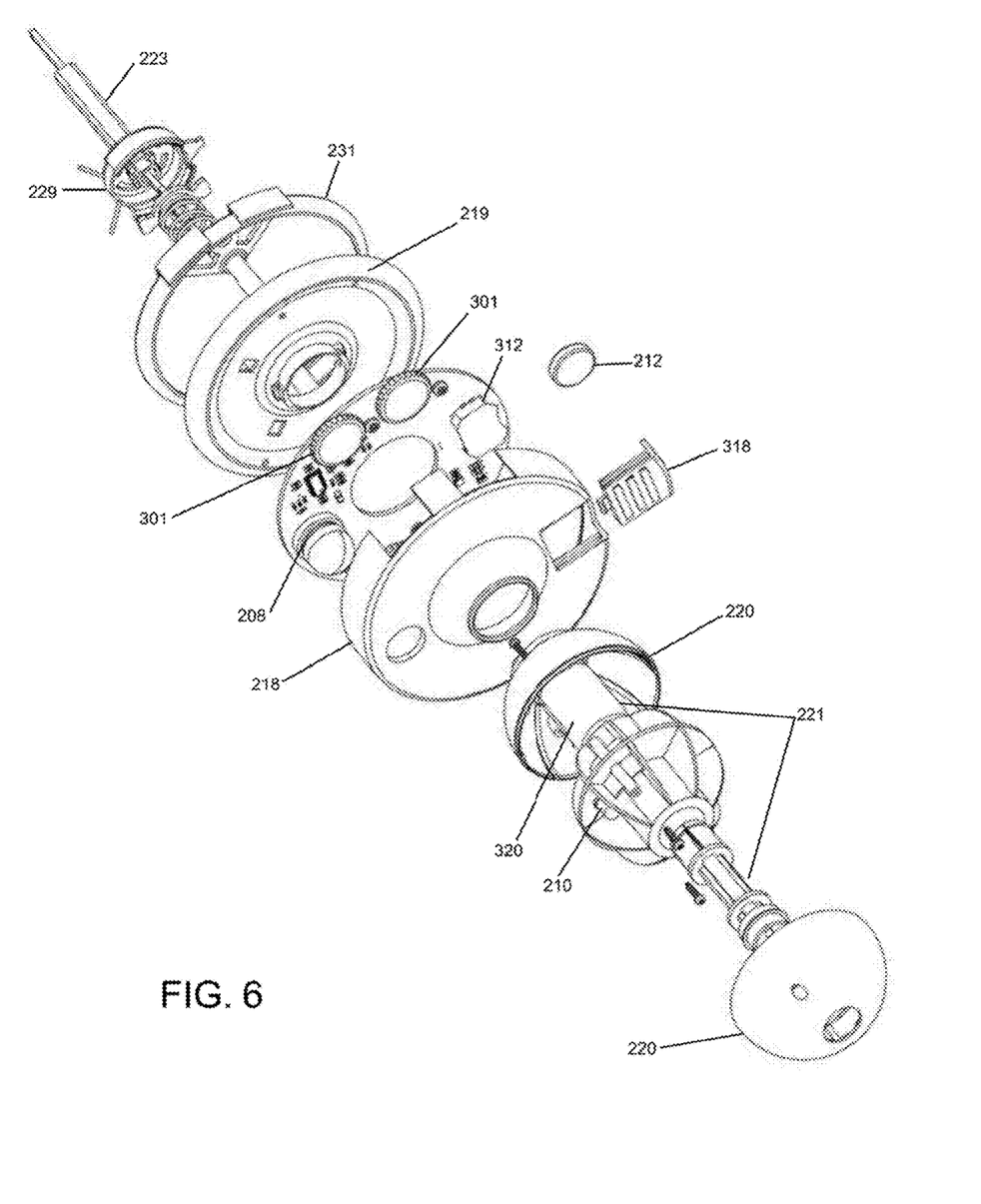
FIG. 6 illustrates the illuminated lockset of FIG. 2 in exploded form without the non-lighted knob or latch present.
Figure 7:
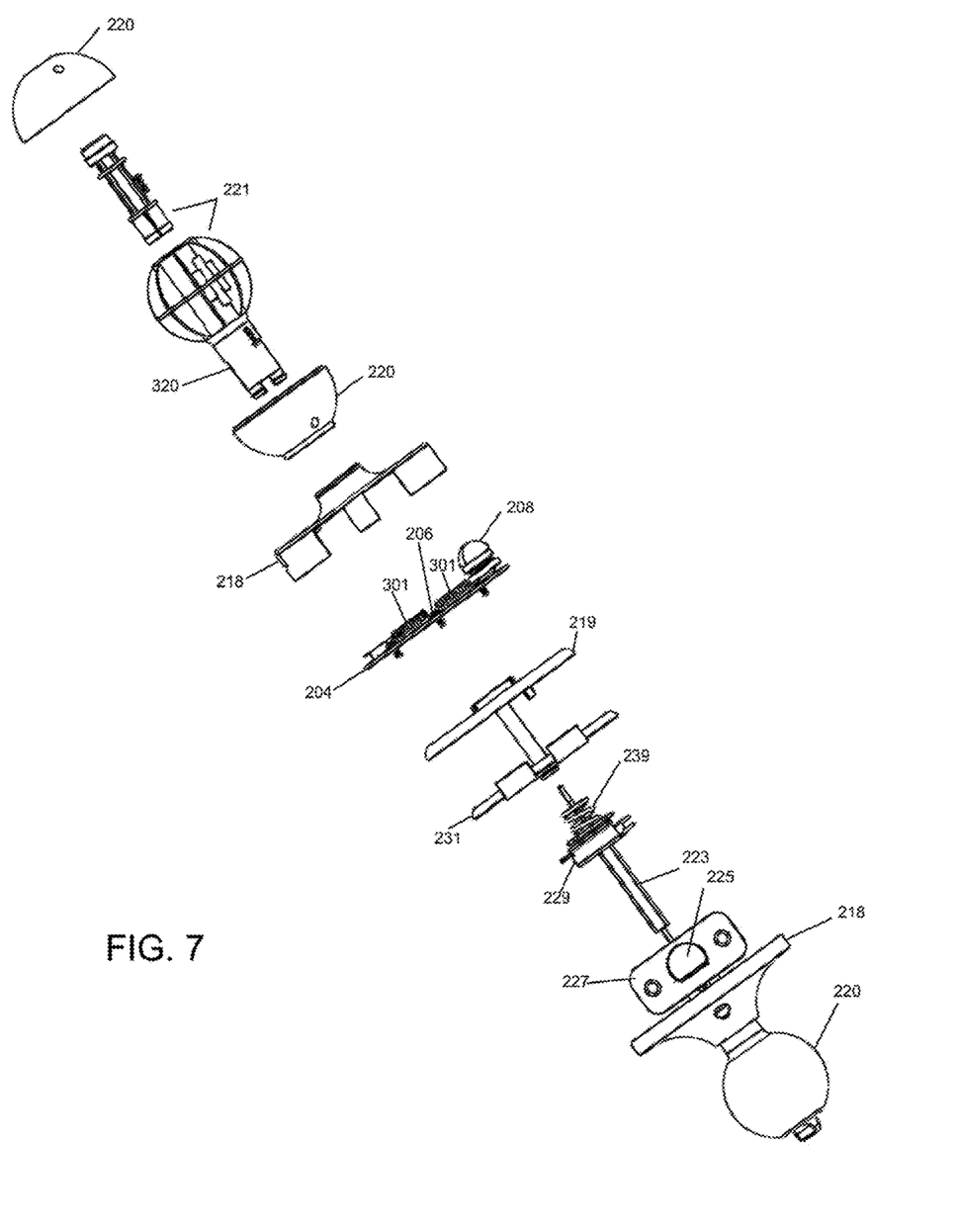
FIG. 7 illustrates a side view of the illuminated lockset of FIG. 6 including the non-lighted knob and lockset.
Figure 8:
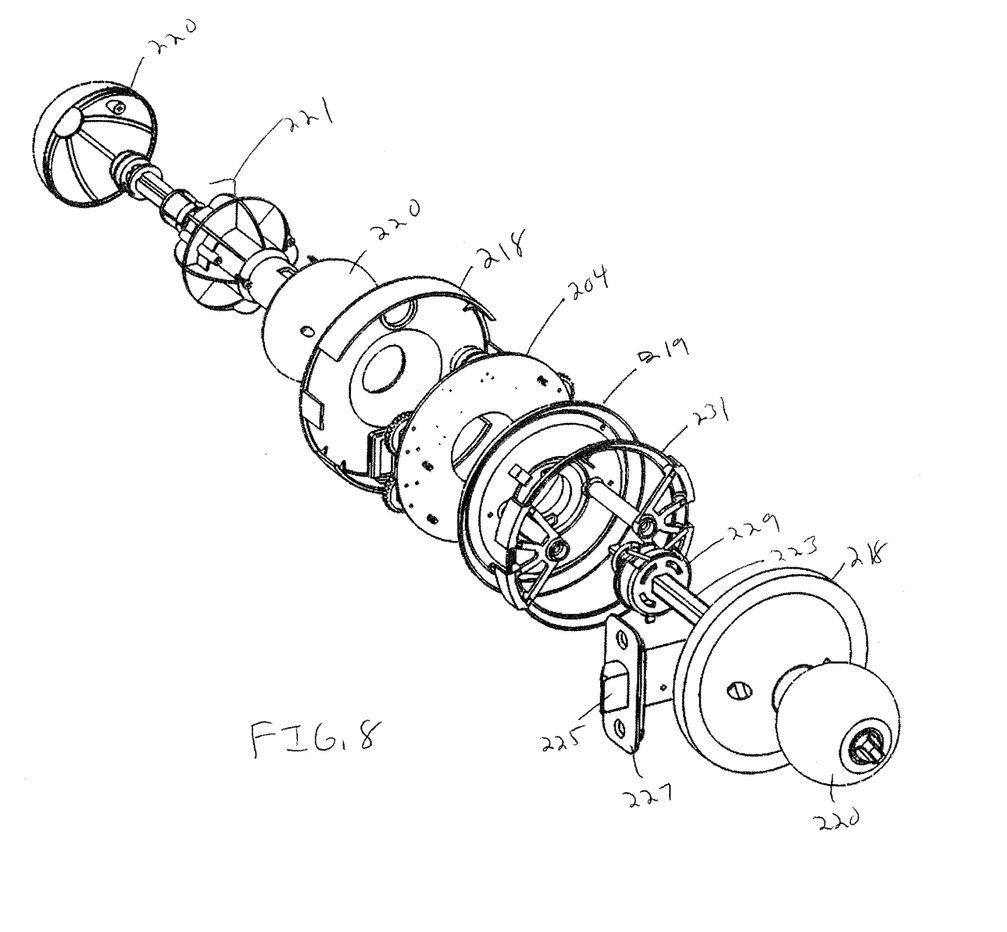
FIG. 8 illustrates a perspective view of the illuminated lockset of FIG. 7.

FIG. 1 illustrates a perspective view of an embodiment of an illuminated doorknob (100). The illuminated doorknob (100) includes a housing (102) configured to be secured to a door in any fashion known to one of ordinary skill in the art. The doorknob (100) generally includes a printed circuit board (104), a light sensor (106), a motion sensor (108), one or more light emitting diodes (110) and a battery (112). The battery (112), printed circuit board (104), light sensor (106), and motion sensor (108) are generally on-board the doorknob, and will commonly be encased within the housing (102) and often within the rose (118) of the doorknob (100) so as to hide components from view during normal operation. The rose (118) may include a removable panel to cover these elements and provide for a finished look. Because sensors (106) and (108) need to have access to environmental or other conditions outside of the housing (102), these may extend beyond the housing (102), have access to holes, voids, or windows to access the environment outside the housing (102), or may be mounted external to the housing (102).

In the depicted embodiment of FIG. 1, the light sensor (106) is connected to the printed circuit board (104) to detect darkness in the room. The motion sensor (108) is connected to the printed circuit board (104) for generating a signal on detecting movement of individual towards the housing in the dark room. The light sensor (106) and motion sensor (108) in the depicted embodiment will generally be provided with a window through the rose (118) or may extend beyond the rose (118) in alternative embodiments so as to correctly sense. Alternatively, they may be presented in an exposed recess in the rose (118) without a cover as shown in FIG. 1.

The one or more light emitting diodes (LED) or other lighting element (110) is connected to the printed circuit board (104) to illuminate upon receiving the signal from the motion sensor (108) that motion is detected and from the light sensor (106) that the surrounding environment is sufficiently dim. A battery (112) or other local power source will generally be provided to power the printed circuit board (104). The doorknob (100) may also include an on-board system for charging the battery (112) such as a solar cell, kinetic collector, or other systems known now or later discovered. The printed circuit board (104) transfers the power from the battery (112) to the light sensor (106), the motion sensor (108) and the light emitter (110). In the embodiment of FIG. 1, the light emitter (110) is aimed out the side of the rose (118) and, therefore, may illuminate the surface of the door or the doorjamb to provide a reflection of those surfaces for view by the human eye. Alternatively, the light emitter (110) may be arranged to illuminate the knob (120) or may be arranged to project light outward from the door.

The motion sensor (108) may include, but is not limited to, passive infrared (PIR), microwave, ultrasonic, tomographic motion detector, or any other type of motion sensor or combination of sensors known now or later discovered. The light sensor (106) may include, but not limited to, CMOS image sensors, optical detectors, photo-detectors such as photodiodes and photo-resistors, or any other type of light sensor or combination of sensors known now or later discovered. The light emitter (110) may include one or more light emitting diodes (LED), organic light emitting diodes (OLED), incandescent bulb, gas discharge tube, arc lamp, laser emitter, or any other type of light emitter or combination of emitters known now or later discovered. The light emitter (110) may be of any color or combination of colors. The battery (112) can include, but is not limited to, any generally portable power source (e.g. that does not require connection to a power grid) including, but not limited to, chemical batteries such as, but not limited to, silicone based batteries, nickel metal hydride (NiMH) batteries, lead-acid batteries, lithium batteries, lithium-ion batteries, and other batteries which generate electricity through chemical reaction; fuel cells, mechanical batteries such as flywheels, pressure batteries such as hydraulic or pneumatic cylinders, or any other type of electrical storage or generation device known now or later discovered.

In the depicted embodiment, the illuminated doorknob (100) also includes a resistor (114) to maintain the flow of the current to the electrical components connected to the printed circuit board (104). In another embodiment of the present invention, the illuminated doorknob (100) includes an audio unit (not shown) to generate audio signals on receiving the signal from the motion sensor (108). This may generate a continuous audio signal, or a spaced signal such as a series of beeps.

The embodiment of a doorknob (100) as depicted in FIG. 1 is generally designed and configured to operate on a single side of a door and therefore may be provided on a door which does not utilize a lockset and which may only have a handle on a single side. As such, the doorknob (100) may be attached to a solid door through any manner known to one of ordinary skill in the art. This is common, for example, on certain closet doors and the like where the doorknob (100) is used to pull the door open, but the door can simply be pushed open from the opposing side (even though this is usually not intended because there is little to no space to physically enter the closet). In the embodiment of FIG. 1, the manual opener (122) is, therefore, merely decorative and may be replaced or removed by other appearances. Alternatively, two doorknobs (100) of the type shown in FIG. 1 may be paired with one positioned on either side of a door. This may be done, for instance, for a door to an interior room of a structure.

FIGS. 2 through 8 provide a related embodiment to that of FIG. 1 but in this case instead of illumination provided in a single sided doorknob (100), there is provided a lockset (200) which is designed to replace a standard lockset of the type understood by those of ordinary skill in the art. The lockset (200) of FIGS. 2 through 8 is a single cylinder lockset having a keyed opener (324) on a first knob (220) and a manual opener (322) on the other knob (220). This is by no means required and in alternative embodiments, the lockset (200) may include keyed openers (324), manual openers (322), and knobs (220) with no opener in any combination so as to create a single cylinder lockset, double cylinder lockset, or a bathroom or bedroom handle (which has no locking mechanism but still has a latch).

The locket (200) of FIGS. 2 through 8 includes most of the standard components of a traditional lockset including the knob (220), rose (218), mounting plate (219), keyway and cylinder (221), spindle (223), latch (225), faceplate (227), chassis (229), and spring (239). A ring (231) is also provided to provide for coverage of gaps in the rose (218) where the adjustment knobs (301) extend through the rose (218). As can be best seen in FIGS. 6, 7 and 8, the knob (220) assembly on the opposing side of the lockset (200) is of standard design with a knob (220) and rose (218). In an alternative embodiment, the illuminated knob side of the lockset (200) may be duplicated on the opposing side so as to provide illumination on both sides of the lockset (200). As is well known to those of ordinary skill in the art, the lockset (200) may be connected to the door (and to itself through the door) using screws or bolts and various mounting holes and connectors may be provided for this purpose. Locksets have traditionally been mounted to holes of particular size, orientation and configuration which are well understood to those of ordinary skill in the art.

In the depicted embodiment of FIG. 2 through 8, the knobs (220) are of generally spherical shape as is well known in many doorknobs, however this is by no means required. In alternative embodiments, the knobs (220) may be generally prolate or oblate spheroids, generally conoids, handles or similar structures, or any other structure which facilities grasping or opening of the door.

As in the embodiment of FIG. 1, the embodiment of FIGS. 2 through 8 utilizes a circuit board (204) upon which is mounted the battery (212) in a battery housing (312), motion sensor (208), and light sensor (206). These components can all be of similar or the same construction as to those corresponding elements discussed above in conjunction in FIG. 1 above. It should also be apparent that the motion sensor (208) in this embodiment extends beyond the rose (218) and the light sensor (206) is provided with a hole (241) in the rose (218) through which it can sense. The circuit board (204) may also include other components to assist in controlling the illumination such as, but not including, a microprocessor, clock circuit, and/or resistors or capacitors. Further, their may be provided wiring (not shown) to electrically interconnect the lighting element (210), which is generally an LED. Alternatively, various components of the cylinder (221) or other components may be electrically conductive to provide power form the battery (212) to the lighting element (210) or the lighting element may receive power wirelessly when such technology is sufficiently developed.

In the embodiment of FIGS. 2 through 8, the battery (220) is access through a battery door (318) so that it may be changed without the need to use tools or disassemble the lockset (200) in any substantial fashion. While the above contemplates that the circuit board (204) and various attached electrical components are located generally within the rose (218), one of ordinary skill in the art would understand that in alternative embodiments, the circuit board (204) may be split into multiple boards and the various electrical components which are discussed herein as attached thereto may be positioned in a variety of other locations throughout the lockset without altering their functionality.

In the embodiment of FIGS. 2 through 8, the circuit board (204) can also have mounted thereon a series of adjustment knobs (301) which can be used to adjust the operation of the LED and the sensitivity of components. In an embodiment, four adjustment knobs (301) are provided which control the brightness (intensity) of the lighting element (210), the time the lighting element remains on after the motion sensor (208) has turned it on, the distance that the motion sensor (208) detects motion where it will indicate to activate the lighting element (210), and the level of ambient light that the light detector (206) will sense before it indicates that the lighting element (210) should be turned on.

The lighting element (210) may be arranged to project light toward the knob (220), through the side of the rose (218), or through the knob (220) itself depending on embodiment. In the depicted embodiment of FIGS. 2 through 9, the knob (220) itself is designed to be lit up so that the knob (220) is visible. The lit knob (220) may be illuminated in a "glow" fashion where the knob (220) is lit and visible to the human eye but generally does not project substantial light, or it may be designed to project light onto other surfaces such as, but not limited to, the door itself.

To provide for light through the knob (220) and from within the knob (220), the knob (220) will commonly be formed of two halves at least one of which will generally be formed of a transparent or translucent material. This material may be in the form of a light diffusor so as to provide that the knob (220) illuminates consistently with a glow. Alternatively, at least one half of the knob (220) may include a lens or similar structure. In a still further embodiment, the lighting element (210) may be positioned generally adjacent a transparent or translucent window which may serve to direct or otherwise alter the produced illumination whether such window is in the knob (220), rose (218), or shaft (320).

In operation, the lockset (200) will generally operate as follows. The circuit board (204) will be arranged so that the LED (210) will not receive power from the battery (212) unless the light sensor (206) has detected that there is a sufficiently low light that activation of the illumination is appropriate based on the setting of the appropriate adjustment knob (301). When this occurs, the system is effectively "armed" and the light can turn on. The motion sensor (208) will now await a detection of motion within a distance which can also be based on the setting of the appropriate adjustment knob (301). When such motion is detected, power is allowed to go from the battery (112) to the lighting element (210) causing the lighting element (210) to emit illumination. If present, an audio device may also be triggered to emit sound simultaneously or in short succession thereto.

Once the lighting element (210) is activated, it will generally stay activated until a specific time window has passed which can also be based on the setting of the appropriate adjustment knob (301). This setting of fixed illumination time is used in an embodiment so that activation of the light element (210) does not cause the light detector (206) to sense too much light and attempt to deactivate the light element (210). Upon expiration of the selected time period, flow of electricity to the light element (210) will cease, and the light element (210) will generally turn off. However, in alternative embodiments, the light element (210) may remain illuminated so long as motion is detected once it has been initially illuminated, and then turn off only after the time window has elapsed following motion no longer being detected. In a still further embodiment, the system may check at the end of the time period if motion is detected and if it is, reset the time counter to allow for illumination to continue until the time period expires again. This latter process may be repeated indefinitely.

While the above embodiments contemplate illumination specifically triggered by the detection of low light conditions and motion being both detected, this is by no means the only way that the doorknob (100) or lockset (200) may become illuminated. The doorknob (100) or lockset (200) may additionally include a manual mechanical or electrical switch, a transceiver or similar component for receiving lighting instructions from another device, or any other mechanism for receiving instructions to illuminate, The discussed embodiments offer various advantages such as allow to attempt to locate a doorknob in a dark room. Further, the discussed embodiments can assist individuals to locate an exit in a smoky room or otherwise where vision may be obscured in an emergency. Further, the door is actually able to alert of intruders or ward off intruders due to the illumination or audible signal. As the embodiments utilize battery power, they can also operate as a night light even in a power outage. Further, as the system only operates the LED when both sufficiently low light and motion are detected, batteries are preserved.

The qualifier "generally" and similar qualifiers, as used in the present case, would be understood by one of ordinary skill in the art to accommodate recognizable attempts to conform a device to the qualified term, which may nevertheless fall short of doing so. This is because terms such as "sphere" are purely geometric constructs and no real-world component is a true "sphere" in the geometric sense. Variations from geometric and mathematical descriptions are unavoidable due to, among other things, manufacturing tolerances resulting in shape variations, defects and imperfections, non-uniform thermal expansion, and natural wear. Moreover, there exists for every object a level of magnification at which geometric and mathematical descriptors fail due to the nature of matter. One of ordinary skill would thus understand the term "generally," and relationships contemplated herein regardless of the inclusion of such qualifiers, to include a range of variations from the literal geometric meaning of the term in view of these and other considerations.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

It will further be understood that any of the ranges, values, properties, or characteristics given for any single component of the present disclosure can be used interchangeably with any ranges, values, properties, or characteristics given for any of the other components of the disclosure, where compatible, to form an embodiment having defined values for each of the components, as given herein throughout. Further, ranges provided for a genus or a category can also be applied to species within the genus or members of the category unless otherwise noted.

The invention claimed is:

1. An illuminated doorknob comprising:
   a housing configured to be secured to a door in place of a doorknob, said housing comprising a rose and a knob;
   a light sensor in said housing configured to generate a signal upon a certain light level being detected;
   a motion sensor in said housing configured to generate a signal on detecting movement of individual towards said housing;
   a light emitting diode configured to illuminate said knob on receiving said signals from said motion sensor and said light sensor; and
   a battery to provide electrical current said light sensor, said motion sensor, and said light emitting diode.

2. The illuminated doorknob of claim 1 further comprising a resistor to maintain flow of current from said battery to said light sensor, said motion sensor, and said light emitting diode.

3. The illuminated doorknob of claim 1 wherein said light sensor, said motion sensor, and said light emitting diode are mounted on a circuit board.

4. The illuminated doorknob of claim 1 wherein said housing further comprises an adjustment knob configured to adjust at least one aspect of the operation of the illuminated doorknob.

5. The illuminated doorknob of claim 1 wherein said doorknob is part of a lockset.

6. The illuminated doorknob of claim 1 further comprising an audio unit which produces a human audible sound while said light emitting diode is illuminated.

7. The illuminated doorknob of claim 1 wherein said light emitting diode illuminates said knob from within said knob.

8. The illuminated doorknob of claim 7 wherein said knob is made of translucent material.

9. The illuminated doorknob of claim 8 wherein said translucent material diffuses light.

10. The illuminated doorknob of claim 8 wherein said light emitting diode is within said rose.

11. The illuminated doorknob of claim 1 wherein said motion sensor extends from said housing.

12. The illuminated doorknob of claim 1 wherein said housing includes a window configured to allow light from said light emitting diode to shine through said window.

13. The illuminated doorknob of claim 12 wherein said window is on said knob.

14. The illuminated doorknob of claim 12 wherein said window is on said rose.

\* \* \* \* \*